(No Model.)  3 Sheets—Sheet 1.
W. A. MILES.
APPARATUS FOR MOLDING IN SAND.
No. 358,982.  Patented Mar. 8, 1887.
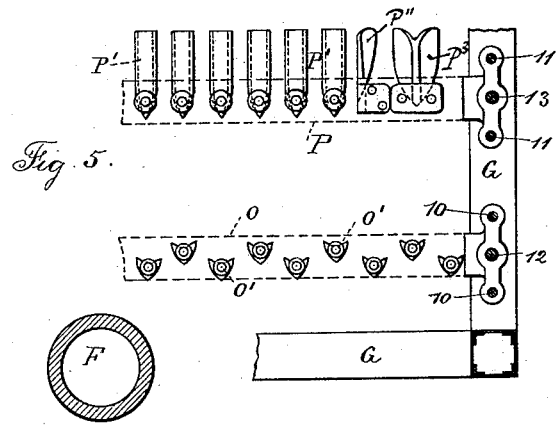
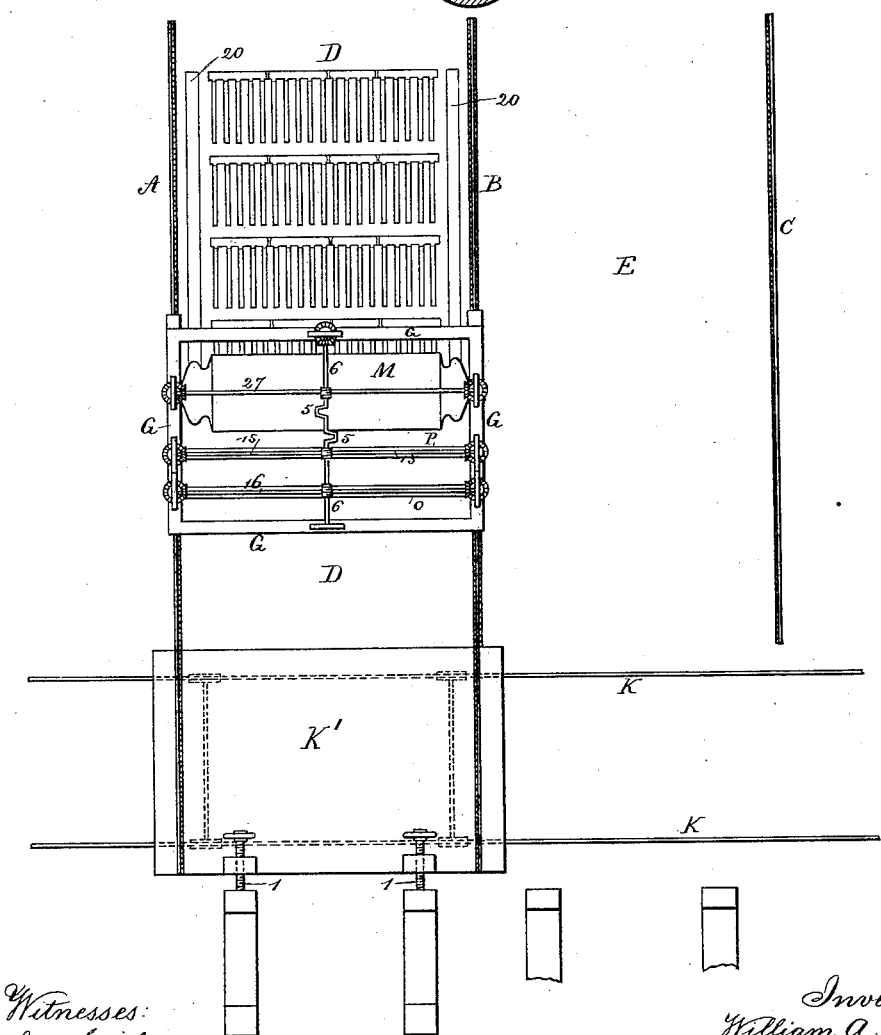
Witnesses:
J. Staib
Chas. H. Smith
Inventor:
William A. Miles
per Lemuel W. Serrell atty

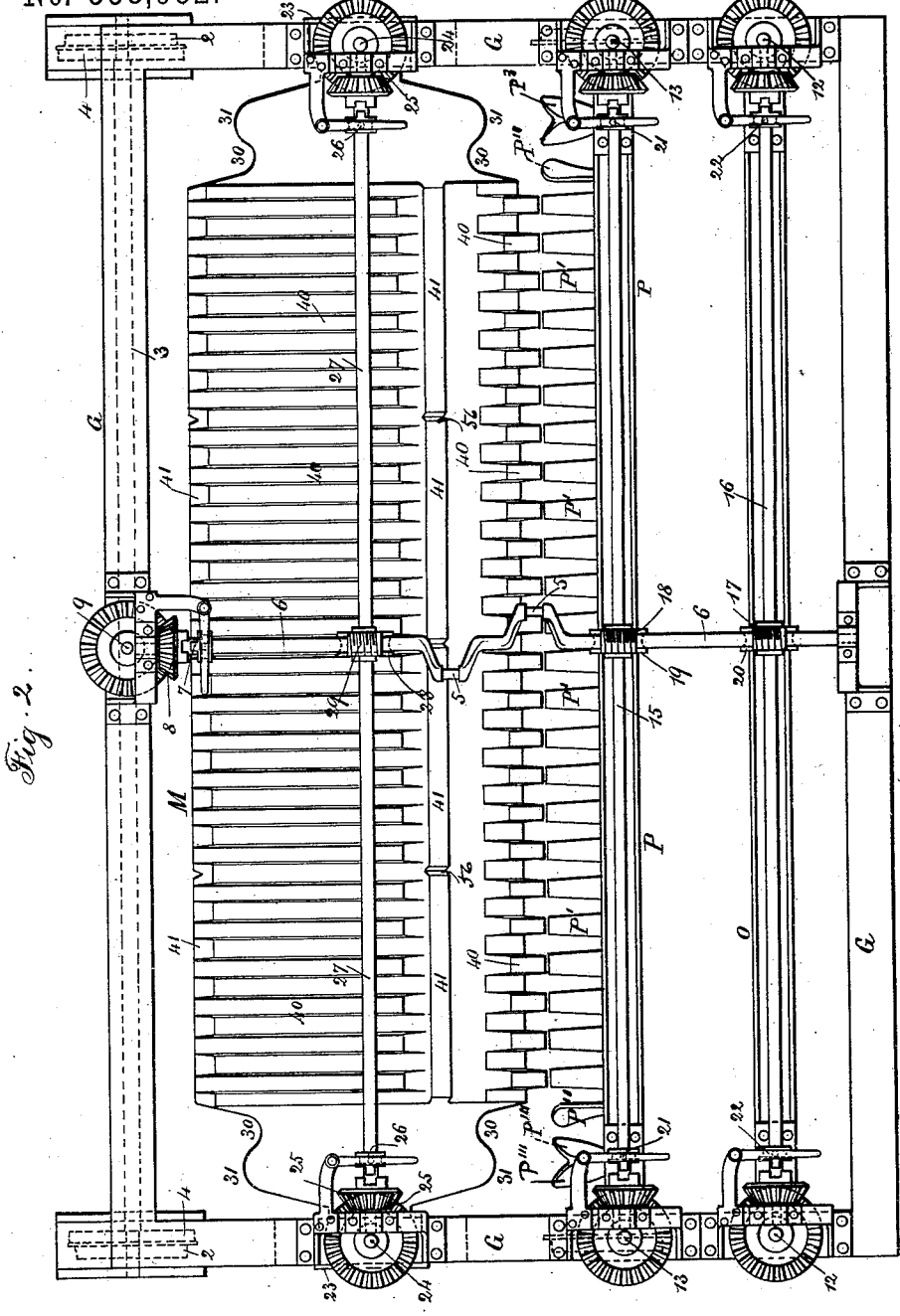

(No Model.) 3 Sheets—Sheet 3.
W. A. MILES.
APPARATUS FOR MOLDING IN SAND.
No. 358,982. Patented Mar. 8, 1887.
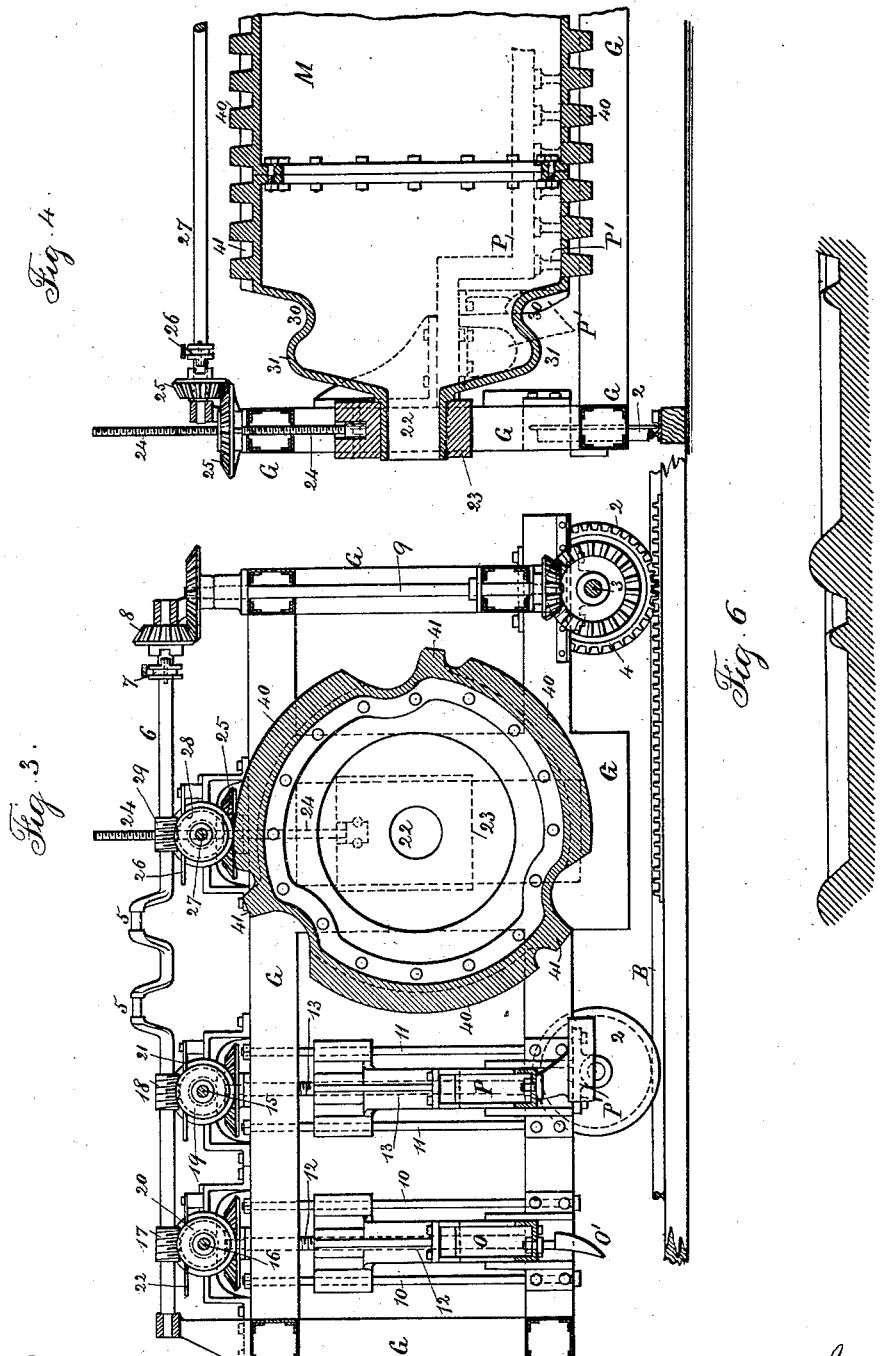
Witnesses:
J. Staib
Chas. H. Smith
Inventor:
William A. Miles
per Lemuel W. Serrell
Atty

UNITED STATES PATENT OFFICE.

WILLIAM A. MILES, OF COPAKE IRON WORKS, NEW YORK.

APPARATUS FOR MOLDING IN SAND.

SPECIFICATION forming part of Letters Patent No. 358,982, dated March 8, 1887.

Application filed June 14, 1886. Serial No. 205,055. (No model.)

*To all whom it may concern:*

Be it known that I, WILLIAM A. MILES, of Copake Iron Works, in the county of Columbia and State of New York, have invented an Improvement in Molding Patterns for Casting, of which the following is a specification.

In preparing the casting-floor for receiving the molten metal in the manufacture of pig-iron considerable expense is involved in molding the patterns and preparing the main-run gates and sow-molds, because the runs and sows require to be at an inclination while the molds for the pigs must be level.

My present improvements, while especially intended for use in the manufacture of pig-iron, may be availed of in the preparation of molds for other castings. I provide tracks upon which the molding mechanism is caused to move by the action of gearing, and the patterns are upon the surface of a cylinder that is rolled over the surface of the molding-sand and gives to the said surface the proper configuration for the main runs and the molds for the sows and pigs. I also make use of agitating-teeth that loosen up the molding-sand of the casting-floor, and there are formers that produce furrows in the sand and give to the surface a configuration approximating that finally given to the surface of the casting-floor by the molding-cylinder.

In the drawings, Figure 1 is a diagrammatic plan view representing a portion of the casting-floor and showing the molding-machine in position over such casting-floor. Fig. 2 is a plan view of the molding-machine. Fig. 3 is a cross-section through the molding-cylinder and the stirrers and formers. Fig. 4 is a sectional elevation through the axis of the molding-cylinder at one of its ends. Fig. 5 is a sectional plan view showing part of the frame, the stirrers, and formers, with their supporting cross-bars in dotted lines; and Fig. 6 is a longitudinal section of part of the molding-floor after the molding-machine has passed over it.

I have represented three tracks, A B C, with molding-floors D and E between said tracks, as these are conveniently made use of in connection with a cupola or other furnace at F; but my improvements may be employed with a single molding-floor, or the number may be increased. These tracks A B C are each composed of a flat rail and a range of rack-teeth adjacent thereto, and the center track, B, should have a rack at each side. Upon these tracks a carriage, G, is mounted, having flanged wheels that run upon the track, and one pair of these wheels, 2, are united by the cross-shaft 3, and there are gear-wheels 4 adjacent to the wheels 2, so that the carriage G may be rolled back and forth upon the tracks with perfect uniformity by revolving the shaft 3.

It is preferable to mount upon the carriage a small boiler and steam-engine having a link-motion or similar device, so that the engine may be revolved in either direction. I have not shown this engine in the drawings; but the same may act upon the cranks 5 of the shaft 6, and at 7 is a coupling by which the shaft 6 may be connected to or disconnected from the pinion 8, that gears to a shaft, 9, that is provided with bevel-gears for rotating the shaft 3. By this means the carriage G and the parts supported by the same can be rolled back and forth upon the tracks A B or B C.

Where more than two tracks and one casting-floor are made use of, there should be a track, K, running transversely at the ends of the tracks A B C, and upon this track K is a transfer-table, K', having upon it tracks and rack-bars that are adapted to become continuations of the tracks A B or B C, so that this transfer-table can be rolled along upon the track K until its tracks are in line with the tracks that support the carriage G. Then this carriage G can be propelled so as to be rolled upon the tracks of the transfer-table, and there may be upon the transfer-table set-up screws 1, acting against stationary blocks to hold the transfer-table firmly in place against the tracks while the carriage G is run upon the same or run off after such transfer-table has been moved to coincide with the tracks that are to receive said carriage.

Upon the carriage G there are cross-bars O and P. These cross-bars are preferably made with bracket-shaped ends guided by the rods 10 10 and 11 11, that are supported by the frame of the carriage G, and there are screws 12 and 13 passing through nuts in the bracket ends of these cross-bars, and these screws 12 and 13 can be revolved by hand for raising or lowering the cross-bars and the parts carried by them; but I prefer to make use of bevel-gearing and cross-shafts 15 and 16 and worm-pinions 17 and 18 upon the shaft 6 with worm-wheels 19 20 and clutches 21 22, whereby either shaft 15 or 16 can be connected with either screw 12 or 13, to rotate the same and raise or lower the cross-bars O and P.

Upon the cross-bar O there are downwardly-projecting teeth O', which are similar to cultivator-teeth, and serve to stir up the molding-sand upon the casting-floor D or E. These stirrers O' are to be sufficiently numerous and placed in the proper positions to effect the thorough breaking up of the caked molding-sand remaining upon the casting-floor after the pigs and sows have been removed. This operation only, however, may be supplemented by hand-labor, or performed entirely by hand, if desired.

It is desirable to finish the molds and the entire surface of the casting-floor, including the main run and the transverse run or sows and the molds for the pigs, at one operation by a properly-formed cylinder, M, as hereinafter described; but in order to give to the molding-sand a surface conforming generally to the configuration of the molding-cylinder M, I make use of formers, scrapers, and plows P' P'' P''', attached to the cross-bar P at the proper places and of the proper shapes—that is to say, the formers P', which are in line with the patterns that form the pig-molds, are similar to small plows to open up furrows that are in line with the patterns that form the pig-molds, and there are scrapers P'' or mold-boards that heap up sand toward the main run 20, and there is a plow, P''', running in line with the main run to open the sand at this place.

I will now describe the peculiarities of the molding-cylinder M. This cylinder is preferably of iron, cast hollow and formed in sections, bolted together. The journals 22 at the ends of the cylinder M are received into bearings 23, that can be raised or lowered within slides on the frame G by the screws 24, bevel-gears 25, clutches 26, cross-shaft 27, worm-wheel 28, and worm-pinion 29, on the shaft 6, so that either or both ends of the molding-cylinder M can be raised or lowered as required either for impressing the patterns into the casting-floor or for raising the molding-cylinder entirely above the casting-floor when running the carriage back. Upon the cylinder M is a neck at 30 and a rounded head, 31. As the carriage and cylinder are rolled over the molding-floor, the annular head 31 forms the main run 20 in the molding-sand for conveying the melted metal from the furnace F to the respective sows and the gates leading to the same.

If two molding-floors are made use of, a neck, 30, and head 31 are to be provided at each end of the molding-cylinder M, in order that the two main runs 20 may be near each other, one at each side of the track B; but if only one casting-floor is used, the neck and head are only required at one end of the cylinder M. The diameter of this cylinder M is such as to contain the desired number of patterns. I have shown the same as adapted to three sets of pig-patterns and the sow and gate patterns for each set, 40 being the pig-patterns and 41 the sow and gate pattern. These may be of any desired size or shape, the sow-patterns 41 running longitudinally upon the molding-cylinder at equal distances apart and the pig-patterns in each set being circumferential and in line with each other.

In casting it is necessary that the main run 20 be sufficiently inclined for the metal to flow along the same freely. With this object in view it is preferable to have the tracks A B C and the entire casting-floors at the inclination required for the main runs, so that the rounding-heads 31 will properly shape the main runs by simply rolling along the same and compressing the molding-sand, which has been stirred up and scraped and formed generally to shape, but loosely, in the manner before described, and it is also preferable to have the track parallel to but slightly higher than the tracks A and C, in order that the molding-cylinder may be at any inclination corresponding to the inclination required for the sow-molds as they pass off from the main run; but by the mechanism before described the screws 12, 13, and 24 may be made use of for raising or lowering the ends of the cross-bars O P and of the molding-cylinder M, so as to accommodate the transverse inclination of the molding-floor without rendering it necessary to have the tracks A C lower than the track B.

In addition to the provision before named, the molds for the pigs should be level, in order that the pig, when cast into such mold, may be of the same thickness throughout. To provide for this, the surface of the cylinder M is not truly cylindrical, but is cam-shaped—that is to say, the distance from the center of the cylinder to the surfaces upon which the sows 41 rest is greater than the distance between the center of the cylinder and the surface at the outer ends of the pig-patterns 40, and this difference in measurement corresponds to the inclination of the tracks A and B upon the length of the tracks over which the carriage passes while molding one set of pig-patterns and the sow for the same, whereby the surface of the molding-floor containing the pig-molds will be level longitudinally of the molding-floor, so that each pig-mold occupies a level position, and the pig-molds will rise one above the other in the form of steps as they approach the furnace.

It is to be understood that in the sow-patterns there will be transverse recesses 56 at the proper distances apart, in order that the sow-molds may be divided up for allowing the sows to be broken off into lengths when taking up the cast metal, and there will be similar recesses in the patterns between the ends of the pigs and the sow to lessen the thickness of the cast metal at these places.

It will now be understood that by my improvements the entire casting-floor can be prepared for receiving the molten metal by running the carriage and parts carried by the same over the floor once. In doing this it is sometimes preferable to commence at the lower end of the casting-floor and run up toward the furnace; but in the drawings the carriage is represented with the stirrers and formers as adapted to preparing the casting-floor, commencing near the furnace and running down the inclination therefrom. If the casting-floor is to be prepared by running up toward the furnace, then the stirrers and formers will be on the opposite side of the molding-cylinder from that shown. It is also to be understood that the molding-sand upon the casting-floor should be moistened after the pigs and sows have been removed, and molding-sand should be added from time to time to maintain the casting-floor in the proper condition. If, however, the casting-floor is not properly prepared by running the carriage over it once, the carriage may be run back to the lower end of the casting-floor and the molding-cylinder and cross-bars set down to the proper place by the screws, and the carriage be run over a second time. In this instance the stirrers and formers may be run through the sand, or they may be raised entirely above the same, so that the molding-cylinder alone may be kept firmly down upon the casting-floor to more fully consolidate the same; and it will be apparent that all the patterns will correspond to the respective molds when the parts are properly started, because the racks and gear-wheels upon the cross-shaft of the carriage cause the said carriage to move with uniformity in moving over the casting-floor in both directions.

Should it be desired to cast two sets of pigs at opposite sides of one main run, the casting-floors at the two sides of the center track, B, may be properly prepared with only one main run at one side of the said track, and the workman, with a suitable bar or tool, will form a channel or gate between the main run and the sow beneath the track B, such track B being sufficiently raised upon posts to allow the molding-sand to pass in beneath the same.

I claim as my invention—

1. The combination, with the tracks and carriage upon the same, of a molding-cylinder, bearings for the same supported in the carriage, and screws for raising or lowering the bearings and regulating the action of the molding-cylinder in impressing the patterns into the sand, substantially as set forth.

2. The combination, with a molding-cylinder having patterns upon its surface, of a carriage for supporting such cylinder, and stirrers for loosening the molding-sand in advance of the molding-cylinder, substantially as set forth.

3. The combination of a molding-cylinder having patterns upon the surface thereof, a carriage for supporting the said molding-cylinder, a cross-bar and stirrer for loosening the sand, and a cross-bar and formers for giving to the surface of the casting-floor the general configuration required, substantially as set forth.

4. The combination, with the tracks, carriage, wheels, rack-bars, and gear-wheels, of a molding-cylinder supported by the carriage, cross-bars and stirrers or formers upon the same, and screws for raising and lowering the respective parts within the frame of the carriage, substantially as set forth.

5. The inclined tracks and carriage, in combination with a molding-cylinder having patterns upon its surface, the surface of the said cylinder being made in eccentric sections, from which the patterns project, substantially as specified, so that the surfaces of the casting-floor into which the patterns are impressed will be level, or nearly so, as set forth.

6. A molding-cylinder having upon its surface the patterns to be impressed in the molding-sand and a neck and circular head for forming the main run through which the casting metal is to flow, substantially as set forth.

7. The combination, with the tracks and carriage, of a molding-cylinder supported by said carriage, screws for raising and lowering the same, a transfer-table having tracks upon the same, and a stationary track for the transfer-table, substantially as set forth.

Signed by me this 28th day of May, 1886.

WILLIAM A. MILES.

Witnesses:
LYMAN B. MELINS,
THOMAS B. KEATING.